July 8, 1969   N. O. YOUNG   3,453,687
PRESSURE GENERATING DEVICE
Filed Sept. 28, 1966   Sheet 1 of 4

Inventor
Niels O. Young
by Roberts Cushman & Grover,
Attys.

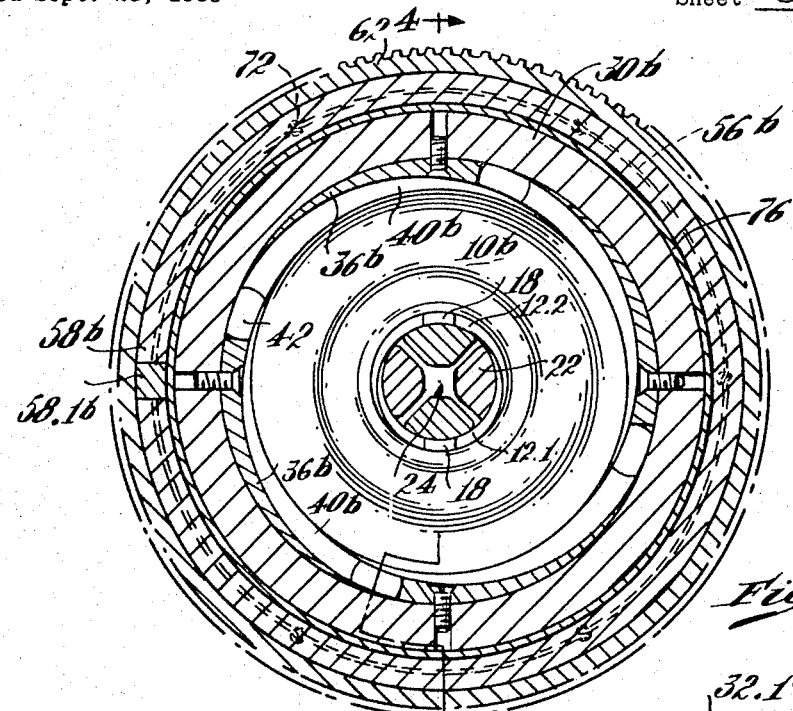
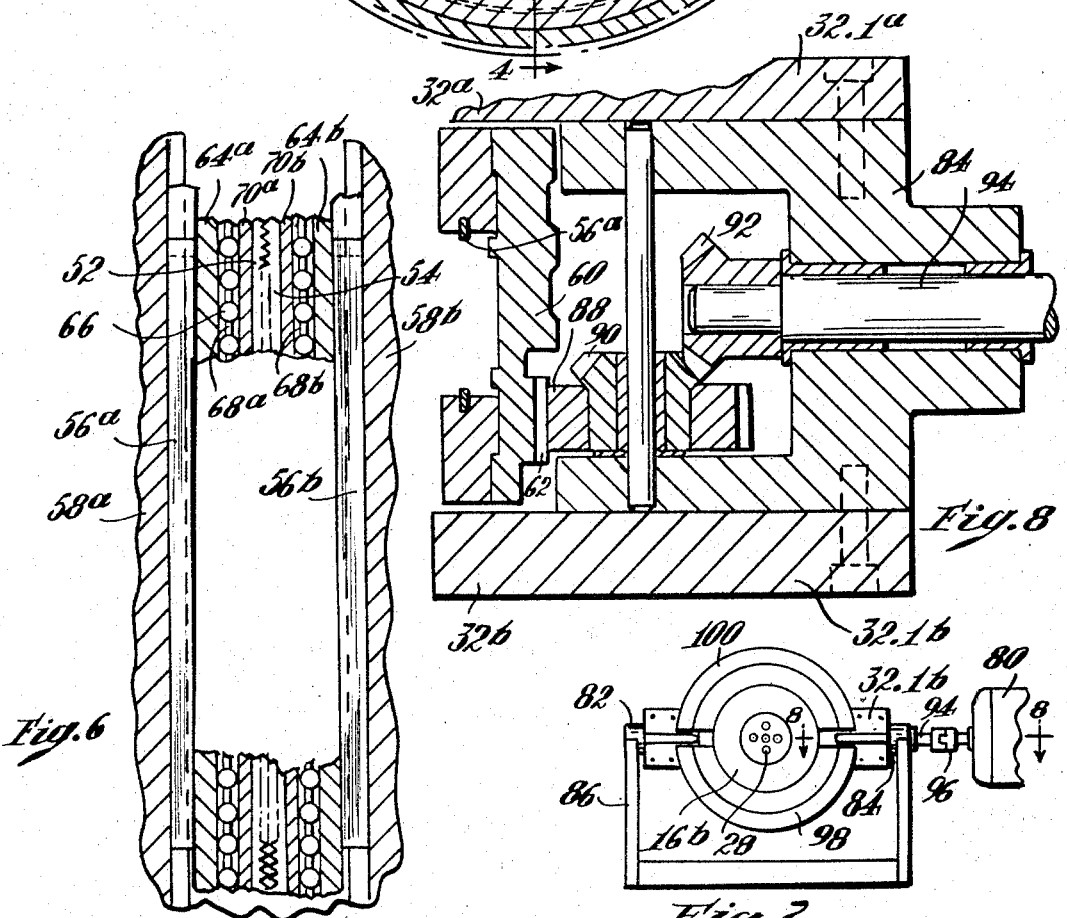

United States Patent Office 3,453,687
Patented July 8, 1969

3,453,687
PRESSURE GENERATING DEVICE
Niels O. Young, Lincoln, Mass., assignor to Block Engineering, Inc., Cambridge, Mass., a corporation of Delaware
Filed Sept. 28, 1966, Ser. No. 582,648
Int. Cl. B29c 17/00
U.S. Cl. 18—5
10 Claims

ABSTRACT OF THE DISCLOSURE

Strip means are coiled in several turns around an object or pressure transmitting core. The strip windings slide freely upon themselves and are forcibly tightened around the object by differential movement of the inner and outer strip ends. A single strip, or interleaved strips, or strips oppositely wound side by side can be used.

---

The field of the present invention relates to pressure generating devices, and more particularly, but not exclusively, to devices for generating ultrahigh pressures.

At present, the devices utilized for generating extremely high pressures are unwieldy. Most of these devices employ hydraulic machinery to exert pressure, and therefore require pumps and a large and heavy frame to mount the hydraulic components. Another notable disadvantage of the present hydraulic equipment is the time per working cycle required, which is determined in part by the hydraulic pump capacity.

Objects of the present invention are to provide a device for generating extremely high pressures which requires no hydraulic machinery, which requires neither a heavy nor a large frame, which can be constructed compactly and inexpensively, which has a short working cycle duration, which can be easily adapted to generate low as well as very high pressures.

The substance of the invention may be shortly stated as contemplating broadly, the generating of pressure on an object by coiling strip means in a multiplicity of windings around the object with freedom of the strip means to slide upon itself, and by forcibly tightening the strip means around the object by relative movement of the inner and outer ends of the strip means. Preferably, a core member that presents a compressible effectively cylindrical surface is interposed between the strips and the object. In a practically important particular aspect, the invention utilizes a pair of strips oppositely wound, side by side, on an effectively cylindrical core surface. The strips are forcibly tightened around the core by a harmonic drive of known principle which moves the outer ends of the strips in opposite directions, and which thereby causes the core to shrink and to generate pressure on an object within the core.

In another aspect, the invention contemplates two strip means wound in an interleaving fashion about a core member.

Whether the strips are arranged side by side or interleaved, either the outer ends can be held fixed with the inner ends attached to the core which is rotated by drive means to tighten the strip, or the core can be fixed and the outer strip ends pulled. Also, movement can be applied differentially to both the outer ends of the strips and their inner ends on the core.

These and other objects and aspects of the novel substance will appear from the following theoretical explanation and detailed description of several practical embodiments of the invention.

The description refers to a drawing in which

FIG. 5 is a section on line 5—5 of FIG. 4;

FIG. 6 is a radially directed view of a portion of the harmonic drive means employed in the embodiment according to FIGS. 4 and 5;

FIG. 7 is a side view of the device according to FIGS. 4 to 6;

FIG. 8 is a partial sectional view on line 8—8 of FIG. 7;

Figure 1:
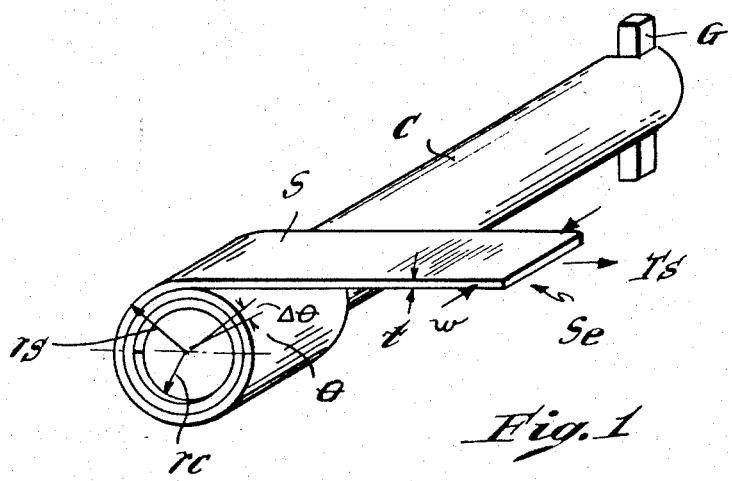
FIGS. 1 to 3 are schematic views presented for the purpose of explaining the theory of operation of the invention.
Figure 2:
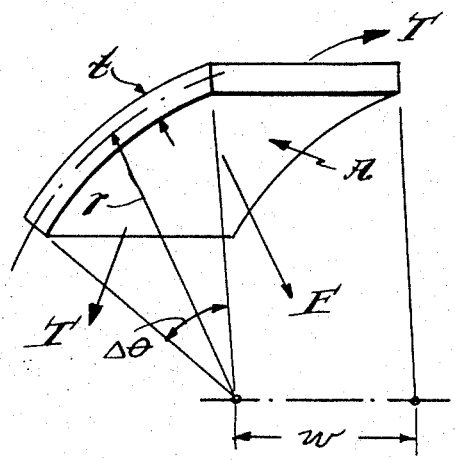
Figure 3:
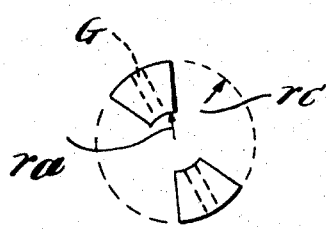

The theory on which the construction and operation of the herein described embodiments of the pressure device according to the invention are based, will first be explaind with reference to FIGS. 1 to 3. In FIG. 1, a cylindrical core C of radius $r_c$ is fixed against rotation, as schematically indicated by a transverse key and groove guide G. Spirally wound on the core is a strip S of uniform width $w$ and thickness $t$. The outside radius of the coil is $r_s$, and its inside radius is $r_c$, the same as the radius of the core. The innermost end of the strip is fixed to the core, and the outer free end of the strip is pulled at a tension $T_s$.

The coiled strip is lubricated so that it slides easily upon itself. Lubricants providing a coefficient of friction below 0.05 are readily obtainable, and therefore, in the following analysis, the effects of friction will be ignored. A rigorous analysis including the effects of friction has been undertaken; it indicates that the following simplified analysis yields results accurate to within a few percent for coefficients of friction on the order of 0.05 and below.

The strip is coiled into a spiral that is described, in polar coordinates, by $$r = \frac{t}{2\pi}\theta + r_c, \text{ for } r_c \leq r \leq r_s$$

The stress in the strip is given by $$S = T_s/wt$$

To find the pressure generated by the coiled strip, we first calculate the radial pressure increment across each strip caused by the tension in the strip. Referring to FIG. 2 which represents a generalized strip portion of an incremental angle $\Delta\theta$, the tension $T$ in the strip resolves into a radial force $F$ which is given by $$F = T \sin \Delta\theta$$

This force acts over an area $A$ given by $$A = wr\Delta\theta = (\Delta\theta)^2 \, wt/4\pi$$

The incremental pressure change $\Delta_p$ in a radial increment $t$ is then given by $$\Delta p/t = \lim(\Delta\theta \to 0) F/tA$$

or, upon performing the indicated operations, by $$\Delta p/t = T/wrt = S/r$$

Because $t$ is very small as compared to $r$, the expression $\Delta p/t$ may be replaced by $dp/dr$. Therefore $dp/dr = S/r$ wherein, as above, $S = T_s/wt$, the stress in the strip.

Ignoring the effects of friction, the tension T within the strip is a constant equal to the tension $T_s$ at the free end of the strip. Because the strip has constant dimensions $t$ and $w$, the stress $S$ is also a constant, equal to the stress $S_e$ at the free end of the strip. The pressure developed at any radius $r$ is then given by $$p = S_e \int_r^{r_s} dr/r = S_e \ln(r_s/r)$$

The above expression can be used to find the optimal sample volume, or the largest available space in which to place a sample, for a given coil size, a given stress in the strip, and a given pressure desired on the sample. The coiled strip of outer radius $r_s$ and inner radius $r_c$ encompasses for practical purposes, instead of the core C, a vise or anvil assembly as shown in FIG. 3. This assembly has an outside radius corresponding to $r_c$ of FIGS. 1 and 2, and a cylindrical sample space of radius $r_a$. The pressure $P_a$ at the vise jaws (at radius $r_a$) is related to the pressure P generated by the coiled strip at radius $r_c$ by the expression:

$$P_a = P_c(r/r_a)$$

where $$P_c = S_e \ln(r_a/r_c)$$

For given values of $P_a$, $S_e$, and $r_s$, the maximum radius $r_a$, and the maximum sample volume can be derived by finding $dr_a/dr$ and equating it to zero. In this manner it is found that the maximum value of $r_a$ occurs when $$\ln(r_s/r_c) = 1$$

or $r_s/r_c = e = 2.718$. The optimum value of $r_a$ is then $$r_a = r_s S_e / e P_a$$

The sample volume $V_s$ is given by $$V_s = w\pi r_a^2 = w\pi r_s^2 S_e^2 / e^2 P_a^2$$

It will be noted that the sample volume varies with the square of the working stress $S_e$. Hence, if the strip is worked at a high stress, the equipment size can be kept down. Because the strip is made of thin material, it can develop high strength, and consequently a significant saving in space and weight over conventional ram-type equipment can be realized in the coil press according to the invention.

In terms of equipment weight M, which is proportional to $r_s^2 w$, the above relation for $V_s$ becomes $$V_s/M = K S_e^2 / P_a^2$$

where $K \leq \pi/\rho e^2$ with $\rho$ the density of the coil material, for example 7.9 g./ml. of cold rolled steel. The inequality expresses the fact that the press as a whole includes other than coil material and that the sample volume $V_s$ is not corrected for gasket and similar volume, nor for vise efficiency.

By way of example, it may be assumed that a steel strip S with dimensions $w = 50$ mm. and $t = .16$ mm. is wrapped several times around a core or vise structure with $r_s = 25$ mm. and lubricated with molybdenum disulfide which has a coefficient of friction of less than 0.05. At a pressure $P_a = 70K$ bar and $S_e = 25$ kg./sq. cm. ths results in a $V_s/M$ value of .502 minimum possible metric tons of coil per liter of sample. Further assuming that frame, power supply, and other auxiliaries are twice the coil weight, that the pressure efficiency at 70K bar is ½, and that the sample occupies about one quarter of the vise jaw gap, the $V_s/M$ ratio decreases by a factor of about 16. At the assumed pressure of 70 kilobars, the equipment will weigh about 12 tons/liter of sample at $S_e = 25$ kg./sq. cm. strip stress which is appreciably lighter than heretofore available press equipment for similar purposes. Test results to the same effect derived from a practical embodiment will be given below with reference to the detailed description of that embodiment.

Referring now to FIGS. 4 to 8, an embodiment of the invention designed to generate ultrahigh pressures will be described. In this embodiment, two strips 10a and 10b of high tensile strength material are utilized. Except for their innermost and outermost wraps, the two strips are lubricated with a lubricant providing a low coefficient of friction such as molybdenum disulfide, and are spirally wound in opposite directions on a core member 12 having an effectively cylindrical outer surface, the unlubricated innermost wraps of each strip frictionally engaging this outer surface. The strips are prevented from sliding axially by a washer 14 which separates the strips, and by end caps 16a and 16b which abut the strips at their outer edges.

As shown in FIG. 5, the core member 12 comprises an inner shoe 12.1 and an outer shoe 12.2 partially surrounding the inner shoe. The inner and outer shoes each have mating crescent shaped cross sections which permit the core member to maintain an effectively cylindrical inner and outer surface as it shrinks when pressure is applied to it. To keep the inner and outer shoes in cylindrical disposition, that is from rotating with respect to each other, the shoes are provided at their ends with axially extending bosses 18 which are constrained to move only in radial directions by radial slots 20 provided in the end caps 16a and 16b.

Spaced within the core member 12 is a plurality of, here four, anvils 22 of shape identical to each other for transmitting pressure from the core member with its shoes to a location central among the anvils. Each anvil 22 extends between the end caps 16a and 16b and is a cylindrical sector truncated to provide a central space 24. Plugs 26a and 26b recessed in end caps 16a and 16b close off the ends of the space 24 within the anvil assembly. The object upon which pressure is desired (not shown) is enclosed in a gasket (not shown) of lava or other suitable material, and it is placed in the space 24. If desired, instruments or sensing devices can be enclosed with the object, and their leads or indicators passed through ports 28 provided in the end caps 16a and 16b.

For tightening the anvil assembly, the outer ends of the strips 10a and 10b are moved relatively to their inner ends by drive rings 30a and 30b which are seated for rotation in annular frame members 32a and 32b respectively. The drive rings are coupled to the outermost wrap of each strip by clutch means 34a and 34b, each of which comprises an outer set of four curved wedges 36a, 36b, respectively, secured to the drive rings by bolts 38a and 38b and an inner set of four curved overlapping wedges 40a, 40b which slidably engage the outer wedges 36 on one side, and which frictionally engage on the other side the outermost wraps of the strips 10a and 10b. As shown in FIG. 5, the outer wedges 36 are uniformly spaced about the respective drive ring and have their narrow ends pointing in the direction in which the outer end of the strip is moved for tightening (here counterclockwise); the inner wedges 40 are disposed with their narrow ends pointing in the opposite direction. Thus, rotation of a drive ring, such as 30b, in a direction which will tighten the strip (counterclockwise in FIG. 5) will cause the inner wedges 40 to slide upon the outer wedges 36 which will thereby cause the inner wedges 40 to remain in contact with the outer wrap of the shrinking coiled strip 10b. Conversely, as the drive ring is moved in a direction to loosen the strip, the inner wedges 40 will slide so as to remain in contact with the expanding strip 10b. This arrangement assures that the forces on the outer wraps of the strips will be uniform and will be substantially tangential with no unbalanced radial component which would tend to displace the core member 12.

To assure that the inner wedges 40 will move synchronously and remain uniformly spaced, each is provided with an axially extending boss 42. The bosses 42 fit into radial slots 44 provided in rotatable synchronizing rings 46a and 46b mounted in the frame members 32a and 32b respectively. The synchronizing rings 46a and 46b, together with portions of the drive rings 30a and 30b, also serve as axial guides to prevent the inner wedges 40 from sliding axially, although they have to slide on each other peripherally. The synchronizing rings are further provided with flanges 46.1a and 46.1b which receive and center the end caps 16a and 16b.

To tighten the strips 10a and 10b and thereby generate pressure, the drive rings 30a and 30b must be rotated in opposite directions. The drive means which accomplishes this will now be described.

Secured to the drive rings 30a and 30b by means of pins 50 (FIGS. 4, 6) is a pair of harmonically meshing face gears 52 and 54. The face gears 52 and 54 have different numbers of teeth; thus the gears can mesh only at a limited number of peripheral sectional regions. For example, if one of the gears has 300 teeth and the other of the gears has 297 teeth, the gears will be relatively positioned to mesh in but three equally spaced positions or sector regions.

By providing means for holding the gears in meshing engagement in at least one of these regions, and further providing means for rotating the holding means circumferentially of the gears, so that the region of meshing engagement moves, it is apparent that the gears will rotate relatively to one another in opposite directions. For each revolution of the region of meshing engagement, gears having 300 and 297 teeth, for example, will rotate $\frac{1}{100}$ revolution with respect to each other in opposite directions. This harmonic drive system is thus well suited for the purpose of moving the drive rings 30a and 30b in opposite directions to tighten strips 10a and 10b about the core 12.

Figure 4:
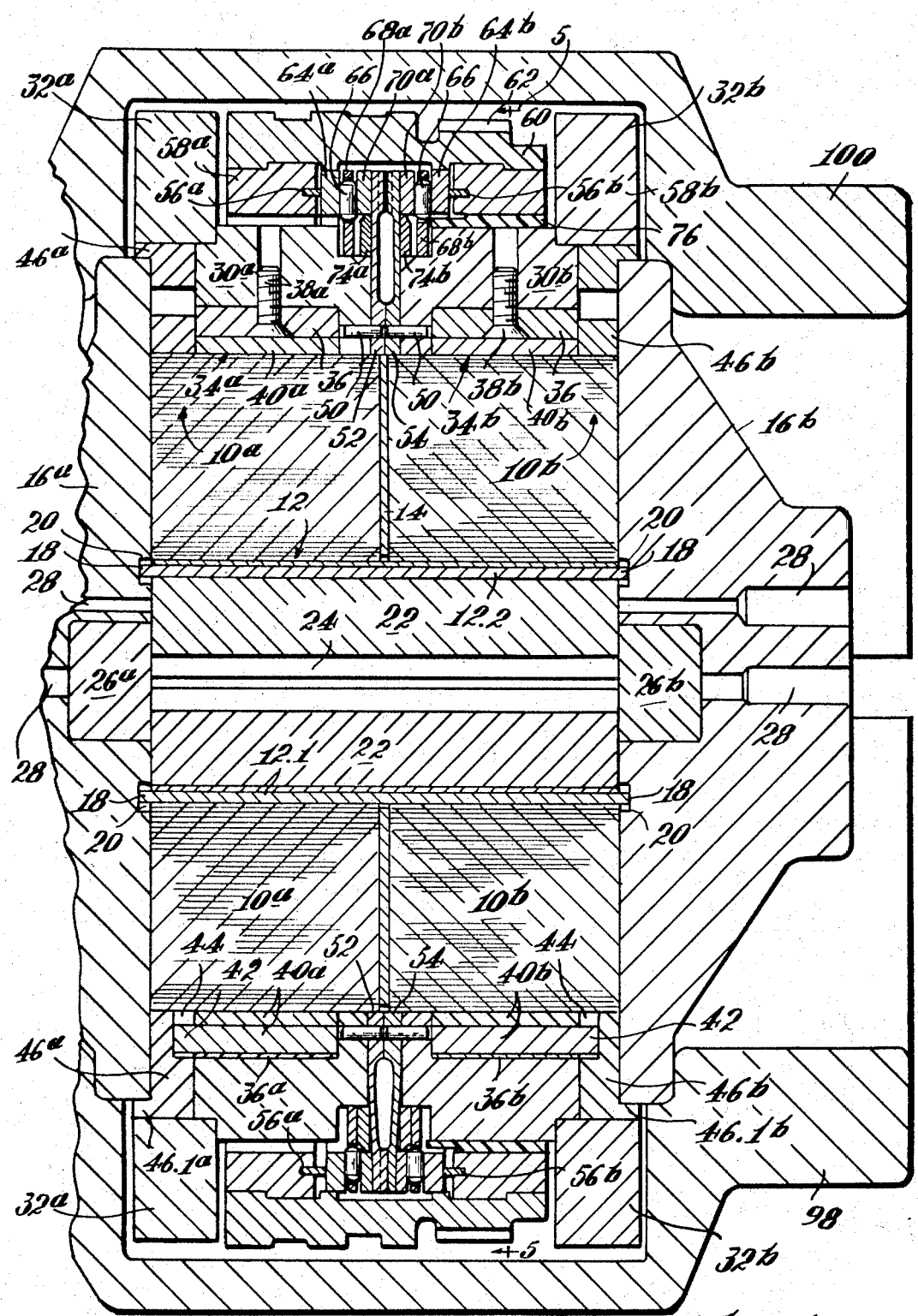
FIG. 4 is an axial cross-section of one practical embodiment of the invention, as on line 4—4 of FIG. 5.
Figure 9:
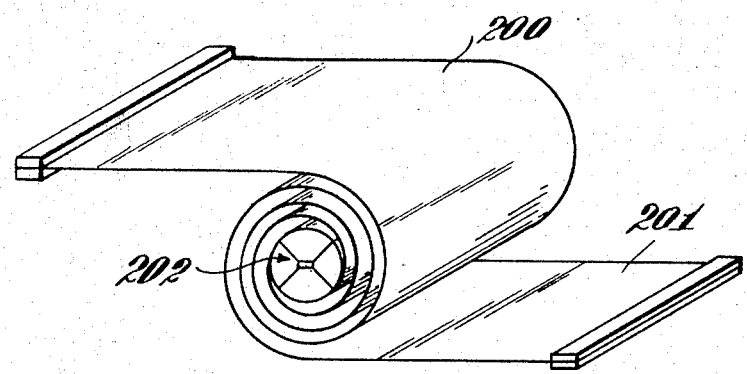
FIG. 9 is a schematic view of a second embodiment of the invention.
Figure 11:
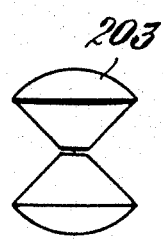
FIG. 11 is an end view of the core assembly shown in FIG. 10.
Figure 12:
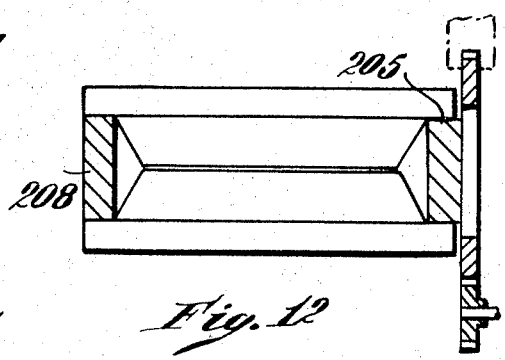
FIG. 12 is a side view of the core assembly of FIG. 10 showing the drive means therefor in section.
Figure 13:
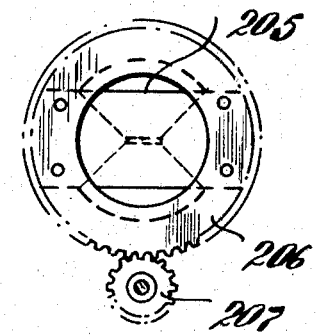
FIG. 13 is a side view of the drive means for the embodiment according to FIGS. 9 to 12.
Figure 10:
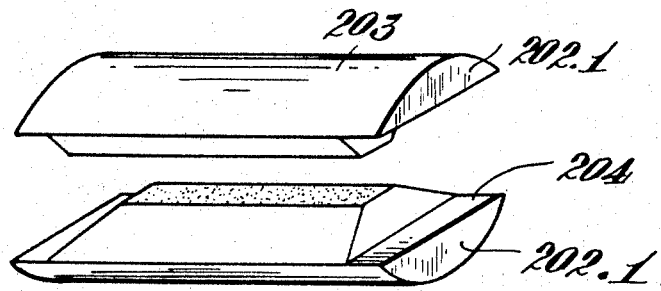
FIG. 10 is an axonometric view of a core assembly used in the embodiment according to FIG. 9.

The face gears 52 and 54 each have an inner portion secured by the pins 50 to the drive rings 30a, 30b, and in sliding engagement with one another; an outer portion upon which the teeth are cut; and a thinner and therefore flexing central portion between the inner and outer portions. Preferably, the teeth on the outer portions are cut slightly conically, so that the teeth will mesh along their entire length when the gears are flexed inwardly into meshing engagement, as shown at the bottom of FIG. 4. To minimize the amount of flexing that takes place in the central flexing portion of the gears, it is preferable to axially locate the teeth such that they are in half-meshing engagement when the gears are in their unflexed state. That is, the teeth are cut such that the gears flex inwardly and outwardly in equal amounts when changing from a completely meshing engagement to a completely nonmeshing engagement.

The face gears 52 and 54 are guided into and out of meshing engagement by a pair of cam strips 56a and 56b (FIGS. 4, 6) which are mounted in circular slots provided in annular cam strip supports 58a and 58b. The cam strip supports are, in turn, secured to and move with, a rim member 60 upon which there is cut a ring gear 62. The cam strip supports 56a and 56b and the rim 60 are provided with interfitting shoulders to prevent axial movement of the cam strip supports. Because of these interfitting shoulders, when assembling the device, it is necessary to reduce the diameter of the cam strip supports 58a and 58b. This is accomplished by removing a portion 58.1a or 58.2a from each cam strip support, bringing the free ends together, to reduce the diameter, inserting the cam strip support in the rim 60, and then replacing the portion 58.1a or 58.1b.

The cam strips 56a and 56b each have lobes to correspond to the regions in which the face gears 52 and 54 will mesh, and they are fixed in the cam strip supports so that these lobes are directly opposed. The cam strips 56a and 56b operate through a bearing assembly comprising outer races 64a and 64b, roller bearings 66 in retainers 68a and 68b, and inner races 70a and 70b, to force the face gears into meshing engagement in equally spaced regions. At points midway between these regions, the cam strips permit the teeth on the face gears to be completely out of mesh. The cam strips are shaped so as to hold the face gears in partially meshing engagement during the transition intermediate these completely meshing and completely unmeshing regions. As shown in FIG. 5, the cam strips may be formed in several segments, the ends of which overlap, and are bent, in holes 72 provided in the cam strip supports 58a and 58b.

As shown in FIG. 4, the drive rings 30a and 30b are provided with ledges which support retainers 68a and 68b, and race-holders 74a and 74b which in turn support inner races 70a and 70b. The race-holders 74a and 74b are chamfered to provide clearance for the roller bearings 66. The outer races 64a and 64b are supported by the rim 60.

The assembly constituted by the rim 60 and cam strip supports 58a and 58b, is separated from the drive rings 30b or 30a by a bearing strip 76 of Teflon or similar material. It should be noted that where the face gears have two or more positions of meshing engagement, this assembly is largely self-aligning because of the axial stiffeners of the face gears when they are in meshing engagement (FIG. 4, bottom). Therefore, only one bearing strip, such as 76, need be used.

The rim 60, to which the cam strips 56a and 56b are fastened by means of cam strip supports 58a and 58b, is provided with a ring gear 62 as previously explained. The ring gear 62 is coupled to a reversible motor 80 by means of the apparatus shown in FIGS. 7 and 8. As shown in these figures, the annular frame members 32a and 32b are provided with integral radial ears 32.1a and 32.1b on opposite sides thereof. One pair of ears 32.1a and 32.1b has a trunnion 82 secured therebetween; the other pair of ears has a trunnion 84 secured therebetween. These trunnions support the press on a base 86, and one of the trunnions, such as 84, contains means for coupling the ring gear 62 with the motor 80. As shown in FIGS. 4 and 8, the ring gear 62 is coupled to the motor 80 by a pinion gear 88 mounted for rotation in the trunnion 84 and meshing with the ring gear 62, and a first bevel gear 90 coaxially secured to the pinion gear 88, and meshing with a second bevel gear 92 transversely mounted for rotation in the trunnion 84 on a shaft 94. The shaft 94 is connected to motor 80 by a coupling 96.

As shown in FIGS. 4 and 7, the device is encased by two half shells 98 and 100 which interfit with end caps 16a and 16b and which are joined together with bolts (not shown). The shells 98 and 100, together with the end caps 16a and 16b, form a protective housing for the device to insure its safe use.

The device shown in FIGS. 4 to 8 operates as follows: The desired sample is placed centrally among the anvils 22 and the space 24. The device is assembled as shown, with leads for electrical instruments, if desired, passing through ports such as 28 provided in end caps 16a and 16b. The motor 80, regulated by a rheostat, for example, is turned on and the shaft 94 is rotated. This causes the ring gear 62 to rotate and causes the cam strips 56a, 56b to move circumferentially around the face gears 52, 54. As the meshing regions of the gears 52, 54 moves, the face gears rotate relatively to one another in opposite directions because of their different numbers of teeth. Since the gears may move together relatively to the cam strips, it is apparent that this drive mechanism has a differential effect. For example, if the strip 10a were initially wound more tightly than the strip 10b, the gear 52 would tend to remain stationary with respect to the core while the gear 54 moved relatively to the gear 52 and the core until the differences in tension were substantially eliminated. After the tensions have been equalized, the two gears will move relatively to the core equally in opposite directions.

As the gears 52, 54 move, they carry the drive rings 30a, 30b along with them. The outer set of wedges 36, attached to the drive rings 30a, 30b, urges the inner set of wedges 40 into contact with the strips 10a and 10b.

The outer wrap of each of the strips is pulled in a tangential direction thereby putting the strip under a tension, and causing pressure to be generated on the core member 12 as hereinbefore explained. As the core member shrinks, the anvils 22 move inwardly to exert pressure on the sample placed thereinbetween.

The embodiment of FIGS. 4 to 8 has been experimentally tested with favorable results. Characteristic results for certain test conditions were obtained as follows:

The strip material used was full hard rolled AISI/301 stainless steel 1.995/1.998 wide and 0.010″ thick with a very smooth surface finish. Each strip 10a and 106 was lubricated by using a metal squeegee to apply a creamy suspension of tungsten diselenide in castor oil. Each coil measured 2.00″ I.D. by 5.60″ O.D. at the time it was installed over the core member 12 and inside the clutch means 34a and 34b. The number of wraps was approximately 160–180. The lubricant film at the time of insertion was estimated to be less than 0.001″ thick.

The pressure gage, inserted directly within the core member 12, had an O.D. of 1.75″ and a bore of 0.375″. This thick-walled tube, by shrinking under pressure, exuded water into a burrette one end of which was open to ambient air. The burrette was calibrated to read the pressure on the outside of the thick-walled tube. This calibration was obtained knowing the mechanical properties of the thick-walled tube and calculating the volume of water displaced as a function of pressure.

A revolution counter was connected to the rim member 60 so that the angular displacement of the coils could be monitored, using, if desired, the known gear ratio between the ring gear 62 on the rim and the face gears, in this case 100:1. Thus 100 turns registered by the counter corresponds to one half turn of each face gear or one turn of the face gears with respect to each other.

A continuous measure of the torque applied by the drive motor 80 was obtained as a measure of the armature current of the compound-wound drive motor. The armature current registered on an ammeter which was calibrated to read inch-lb. of torque directly. The motor turned at 641:1 with respect to differential coil turns.

Using this experimental test apparatus, the coil press was used for repetitive pressure generation to over 35 tons/sq. meter on the sample volume of 165 cubic cms. constituted by the pressure gage. It was found that pressure build up was largely uniform, with minor backlash due to stick-slip and extrusion of lubricant being observed. Pressure build up was rapid as well, a valve in excess of 35 tons/sq. meter being obtained in less than three minutes. During little more than two turns of the face gears with respect to each other, the observed pressure increased from zero to more than 35 tons/sq. meter, at which point the input torque registered 15.5 cm.-kg. The coil press did not unwind itself as a clock-spring would, as there was sufficient friction between the wraps to maintain high values of pressure on the gage. However, the strips readily unwound to reduce pressure upon application of power, showing that the press can be used to carry out a completely controlled pressure cycle.

Referring now to FIGS. 9 through 13, another embodiment of the invention will now be described. In this embodiment, two strips 200, 201 are wound in an interleaved manner around a core member 202. The outer ends of the strips 200, 201 are held fixedly in place, as is symbolically represented in FIG. 9. The core member about which the strips are wrapped comprises two or more anvils 202.1. Each anvil 202.1 has a cylindrical outer surface 203 and a flat step 204 on its inner surface. Loosely engaging the flat steps 204 of the anvils 202.1 is a key 205. The key 205 is secured to a gear 206 driven by a second gear 207 which is attached to a motor (not shown). If desired, the anvils may be driven by keys inserted at both ends, or in one of the anvils there may be loosely inserted a spacer 208 (FIG. 12) to prevent the anvils from twisting.

This second embodiment operates as follows: An object upon which pressure is desired is placed between the anvils 202.1. The spacer 208 and key 205 are inserted between the steps 204 of the anvils. The key 205 is rotated in the direction such as to tighten the strips 200 and 201. As previously explained, the tension in the strip creates a pressure on the core member (here the anvils 202), causing them to move inwardly to exert pressure on the object.

It will now be understood that instead of holding one end of a strip and moving the other, a force differential can be applied with equal or unequal strip end excursions effective in opposite senses, or unequal excursions effective in the same sense.

I claim:
1. A device for generating pressure on an object, comprising:
   strip means wrapped in a multiplicity of superimposed windings around the object with freedom to slide upon itself; and
   means for forcibly tightening the strip means around the object by relative movement of the inner and outer ends of the strip means, thereby generating pressure upon the object.
2. A device according to claim 1 wherein the strip means comprises a pair of adjacent strips each having freedom to slide upon itself.
3. A device according to claim 1 wherein the tightening means comprises:
   a core member interposed between the object and the strip means, the core member having an effectively cylindrical shrinkable surface with the inner end of the strip means attached to the surface; and
   means for relatively moving the core member and the outer end of the strip means, thereby causing the surface of the core member to shrink and thereby generating pressure on the object within the core member.
4. A device according to claim 3 further comprising anvil means interposed between the core member and the object for transmitting pressure from the core member to the object.
5. A device according to claim 3 wherein the core member comprises:
   an outer shoe having a crescent shaped cross section;
   an inner shoe having a crescent shaped cross section disposed partially within the outer shoe to form therewith an effectively cylindrical outer surface; and
   means for synchronously holding the inner and outer shoes in the cylindrical disposition of the outer surface.
6. A device according to claim 5 wherein the strip moving means comprises:
   a pair of coaxial harmonically meshing face gears having different numbers of teeth on essentially equal gear radii, whereby the gears can mesh at periodically located peripheral regions;
   means for coupling each gear to an outer end of a respective strip;
   means for holding the gears in meshing relationship in at least one of the periodically located regions; and
   means for moving the holding means circumferentially of the gears, thereby moving the regions of meshing engagement and moving the gears relatively to each other in opposite directions to tighten the strips about the core.
7. A device according to claim 6 wherein the gear and strip coupling means comprises:
   a drive ring secured to the gear and coaxially surrounding the strip;
   an outer set of curved wedges secured to the drive ring in uniformly spaced relationship and with their narrow ends pointing in the tightening direction of the outer end;

an inner set of curved wedges engaging the outer end of the strip on one side and slidably engaging the other side of the outer set of wedges, the inner set of wedges pointing with their narrow ends oppositely to the direction of the outer set, the inner set of wedges being uniformly spaced so as to form a substantially cylindrical inner surface; whereby as the drive ring is turned the inner wedges slide to adjust the variations in the size of the coiled strip; and synchronizing means for maintaining the inner set of wedges in uniformly spaced relationship.

8. A device according to claim 1 wherein
the strip means includes a pair of adjacent strips wound in opposite directions around the objects; and
the tightening means includes
a core member interposed between the object and the strips, and core member presenting a compressible effectively cylindrical surface with the inner ends of the strips attached thereto; and
means for moving the outer ends of each of the strips relatively to the respective inner ends.

9. A device according to claim 1 wherein the strip means comprises a plurality of interleaved strips each having freedom to slide upon adjacent strips.

10. A device according to claim 9 wherein the tightening means comprises:
a core member interposed between the object and the interleaved strips and having an effectively cylindrical shrinkable surface with the inner ends of the strips attached to the surface; and
means for relatively moving the core member and the outer ends of the strips.

References Cited

UNITED STATES PATENTS

| | | | |
|---|---|---|---|
| 759,451 | 5/1904 | Kurlfinke | 100—212 X |
| 1,081,330 | 12/1913 | Price | 18—6 |
| 1,208,524 | 12/1916 | Edwards | 100—212 |
| 1,297,375 | 3/1919 | McCandlish et al. | 100—212 |
| 1,931,964 | 10/1933 | Rappsaet | 18—6 X |
| 2,495,796 | 1/1950 | White et al. | 100—212 |
| 2,825,114 | 3/1958 | Kolodin | 100—212 |
| 2,834,985 | 5/1958 | Moog. | |

WILLIAM J. STEPHENSON, *Primary Examiner.*

U.S. Cl. X.R.

18—1, 19; 74—640; 100—212